US010378456B2

(12) United States Patent
Stuttaford et al.

(10) Patent No.: US 10,378,456 B2
(45) Date of Patent: Aug. 13, 2019

(54) METHOD OF OPERATING A MULTI-STAGE FLAMESHEET COMBUSTOR

(71) Applicant: ANSALDO ENERGIA SWITZERLAND AG, Baden (CH)

(72) Inventors: Peter John Stuttaford, Jupiter, FL (US); Khalid Oumejjoud, Palm Beach Gardens, FL (US); Fred Hernandez, Jupiter, FL (US); Hany Rizkalla, Stuart, FL (US); Timothy Hui, Palm Beach Gardens, FL (US); Matthew Yaquinto, Jupiter, FL (US); Jesse Sewell, Hobe Sound, FL (US)

(73) Assignee: ANSALDO ENERGIA SWITZERLAND AG (CH)

( * ) Notice: Subject to any disclaimer, the term of this patent is extended or adjusted under 35 U.S.C. 154(b) by 1079 days.

(21) Appl. No.: 14/956,048

(22) Filed: Dec. 1, 2015

(65) Prior Publication Data
US 2016/0084169 A1 Mar. 24, 2016

Related U.S. Application Data

(63) Continuation-in-part of application No. 14/038,070, filed on Sep. 26, 2013.
(Continued)

(51) Int. Cl.
F02C 9/28 (2006.01)
F23R 3/34 (2006.01)
(Continued)

(52) U.S. Cl.
CPC ............... *F02C 9/28* (2013.01); *F02C 7/228* (2013.01); *F02C 9/26* (2013.01); *F02C 9/34* (2013.01);
(Continued)

(58) Field of Classification Search
CPC .... F02C 7/228; F02C 9/28; F02C 9/34; F23R 3/343; F23R 3/346
See application file for complete search history.

(56) References Cited

U.S. PATENT DOCUMENTS 2,457,157 A 12/1948 King, Jr.
3,168,810 A * 2/1965 Gratzemeyer ............ F02C 3/10
60/39.25
(Continued)

FOREIGN PATENT DOCUMENTS

EP 0747635 A1 12/1996
WO 9906767 A1 2/1999

OTHER PUBLICATIONS

Non-Final Office Action dated Mar. 24, 2016 in U.S. Appl. No. 14/038,070, 20 pages.
(Continued)

Primary Examiner — Gerald L Sung
Assistant Examiner — Marc Amar
(74) Attorney, Agent, or Firm — Hovey Williams LLP

(57) ABSTRACT

The present invention discloses a novel way of controlling a gas turbine engine using detected temperatures and detected turbine rotor speed. An operating system provides a series of operating modes for a gas turbine combustor through which fuel is staged to gradually increase engine power, yet harmful emissions, such as carbon monoxide, are kept within acceptable levels.

20 Claims, 12 Drawing Sheets

Related U.S. Application Data

(60) Provisional application No. 62/085,923, filed on Dec. 1, 2014, provisional application No. 61/708,323, filed on Oct. 1, 2012.

(51) Int. Cl.
| | | |
|---|---|---|
| *F02C 9/34* | (2006.01) | |
| *F02C 7/228* | (2006.01) | |
| *F02C 9/26* | (2006.01) | |
| *F23R 3/28* | (2006.01) | |

(52) U.S. Cl.
CPC .............. *F23R 3/286* (2013.01); *F23R 3/343* (2013.01); *F23R 3/346* (2013.01); *F05D 2270/08* (2013.01); *F05D 2270/082* (2013.01); *F05D 2270/091* (2013.01); *F05D 2270/303* (2013.01); *F05D 2270/304* (2013.01); *F05D 2270/31* (2013.01); *F05D 2270/331* (2013.01); *F05D 2270/335* (2013.01); *F23R 2900/03343* (2013.01)

(56) References Cited

U.S. PATENT DOCUMENTS

| | | | |
|---|---|---|---|
| 3,759,038 A | 9/1973 | Scalzo et al. | |
| 4,735,052 A | 4/1988 | Maeda et al. | |
| 4,910,957 A | 3/1990 | Moreno et al. | |
| 4,928,481 A | 5/1990 | Joshi et al. | |
| 5,121,597 A * | 6/1992 | Urushidani | F02C 7/26 60/733 |
| 5,129,226 A | 7/1992 | Bigelow | |
| 5,319,935 A | 6/1994 | Toon et al. | |
| 5,408,825 A * | 4/1995 | Foss | F23D 17/002 60/39.463 |
| 5,452,574 A | 9/1995 | Cowell et al. | |
| 5,469,700 A * | 11/1995 | Corbett | F02C 9/28 60/39.281 |
| 5,537,864 A * | 7/1996 | Sood | F23R 3/26 60/39.27 |
| 5,584,171 A * | 12/1996 | Sato | F02C 9/50 60/39.27 |
| 5,584,684 A | 12/1996 | Dobbeling et al. | |
| 5,676,538 A | 10/1997 | Lovett | |
| 5,802,854 A | 9/1998 | Maeda et al. | |
| 5,983,642 A | 11/1999 | Parker et al. | |
| 6,056,538 A | 5/2000 | Buchner et al. | |
| 6,094,916 A | 8/2000 | Puri et al. | |
| 6,513,334 B2 | 2/2003 | Varney | |
| 6,558,154 B2 | 5/2003 | Eroglu et al. | |
| 6,634,175 B1 | 10/2003 | Kawata et al. | |
| 6,935,116 B2 | 8/2005 | Stuttaford et al. | |
| 6,986,254 B2 | 1/2006 | Stuttaford et al. | |
| 7,093,445 B2 | 8/2006 | Corr, II et al. | |
| 7,137,256 B1 * | 11/2006 | Stuttaford | F02C 7/228 60/773 |
| 7,237,384 B2 | 7/2007 | Stuttaford et al. | |
| 7,308,793 B2 | 12/2007 | Oumejjoud et al. | |
| 7,373,778 B2 | 5/2008 | Bunker et al. | |
| 7,513,115 B2 | 4/2009 | Stuttaford | |
| 7,540,152 B2 | 6/2009 | Tanimura et al. | |
| 7,677,025 B2 | 3/2010 | Stuttaford et al. | |
| 7,770,395 B2 | 8/2010 | Tanimura et al. | |
| 7,886,545 B2 | 2/2011 | Lacy et al. | |
| 8,448,444 B2 | 5/2013 | Cihlar et al. | |
| 8,656,721 B2 | 2/2014 | Matsumoto et al. | |
| 2002/0043067 A1 * | 4/2002 | Maeda | F23C 6/047 60/776 |
| 2003/0154722 A1 * | 8/2003 | Mistry | F23K 5/18 60/776 |
| 2004/0006993 A1 | 1/2004 | Stuttaford et al. | |
| 2004/0211186 A1 * | 10/2004 | Stuttaford | F23R 3/14 60/737 |
| 2004/0226300 A1 * | 11/2004 | Stuttaford | F23R 3/286 60/773 |
| 2004/0255594 A1 * | 12/2004 | Baino | F02C 9/26 60/773 |
| 2005/0284442 A1 * | 12/2005 | Stuttaford | F02C 7/266 123/297 |
| 2006/0162337 A1 * | 7/2006 | Stuttaford | F23R 3/14 60/776 |
| 2006/0168966 A1 | 8/2006 | Stuttaford et al. | |
| 2006/0218929 A1 * | 10/2006 | Murakami | F02C 9/28 60/773 |
| 2006/0260316 A1 * | 11/2006 | Stuttaford | F23D 14/82 60/737 |
| 2007/0021899 A1 * | 1/2007 | Griffin | F02C 9/34 701/100 |
| 2007/0089419 A1 | 4/2007 | Matsumoto et al. | |
| 2008/0083224 A1 * | 4/2008 | Varatharajan | F23R 3/14 60/748 |
| 2008/0173019 A1 * | 7/2008 | Kobayashi | F23R 3/286 60/739 |
| 2009/0111063 A1 | 4/2009 | Boardman et al. | |
| 2010/0000222 A1 * | 1/2010 | Price | F01D 15/10 60/773 |
| 2010/0170254 A1 * | 7/2010 | Venkataraman | F02C 7/228 60/746 |
| 2010/0300108 A1 * | 12/2010 | Demougeot | F02C 7/228 60/773 |
| 2010/0319349 A1 | 12/2010 | Rajaram et al. | |
| 2010/0319350 A1 | 12/2010 | Landry et al. | |
| 2010/0326079 A1 | 12/2010 | Zuo et al. | |
| 2011/0016867 A1 | 1/2011 | Milosavljevic | |
| 2011/0067402 A1 | 3/2011 | Wiebe et al. | |
| 2011/0094233 A1 | 4/2011 | Kashihara et al. | |
| 2011/0113784 A1 | 5/2011 | Headland et al. | |
| 2011/0185703 A1 | 8/2011 | Dodo et al. | |
| 2011/0265487 A1 * | 11/2011 | Gauthier | F02C 7/228 60/773 |
| 2011/0296839 A1 | 12/2011 | Van Nieuwenhuizen et al. | |
| 2012/0045725 A1 | 2/2012 | Takiguchi et al. | |
| 2012/0047897 A1 | 3/2012 | Hirata et al. | |
| 2012/0186256 A1 | 7/2012 | Dai et al. | |
| 2013/0174571 A1 * | 7/2013 | Abe | F02C 9/26 60/776 |
| 2014/0090389 A1 | 4/2014 | Stuttaford et al. | |
| 2014/0090390 A1 | 4/2014 | Stuttaford et al. | |
| 2014/0090396 A1 | 4/2014 | Stuttaford et al. | |
| 2014/0090400 A1 | 4/2014 | Stuttaford et al. | |
| 2014/0200721 A1 * | 7/2014 | Rizkalla | F02C 7/228 700/282 |
| 2015/0075172 A1 | 3/2015 | Stuttaford et al. | |
| 2015/0184856 A1 | 7/2015 | Stuttaford et al. | |
| 2015/0184858 A1 | 7/2015 | Stuttaford et al. | |

OTHER PUBLICATIONS

Non-Final Office Action dated Mar. 25, 2016 in U.S. Appl. No. 14/038,064, 14 pages.

Non-Final Office Action dated May 2, 2016 in U.S. Appl. No. 14/038,056, 10 pages.

Non-Final Office Action dated May 16, 2016 in U.S. Appl. No. 14/038,029, 14 pages.

Notice of Allowance dated Jan. 20, 2016 in U.S. Appl. No. 14/038,016, 9 pages.

Non-Final Office Action dated Feb. 11, 2016 in U.S. Appl. No. 14/038,038, 10 pages.

\* cited by examiner

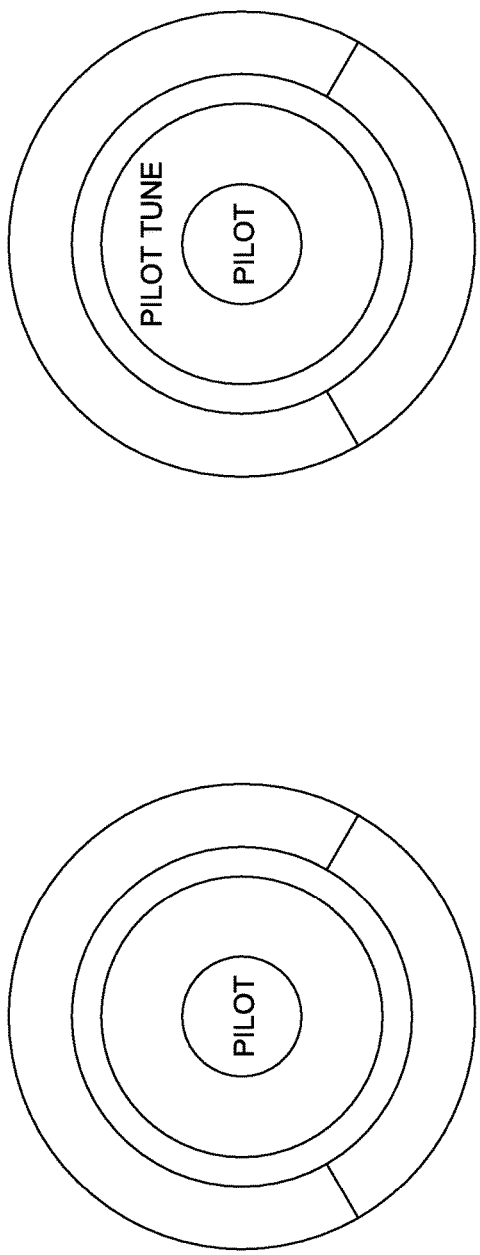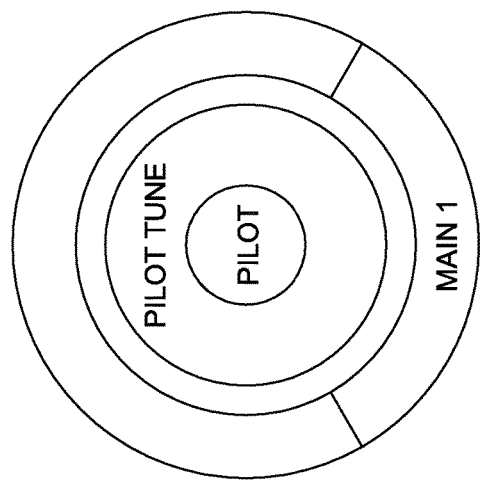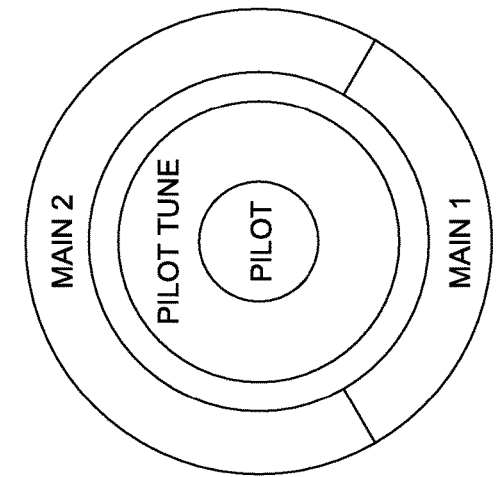
FIG. 7A. FIG. 7B. FIG. 7C. FIG. 7D.

METHOD OF OPERATING A MULTI-STAGE FLAMESHEET COMBUSTOR

CROSS-REFERENCE TO RELATED APPLICATIONS

This application is a continuation-in-part of pending U.S. Nonprovisional application Ser. No. 14/038,070, filed Sep. 26, 2013, titled "Method of Operating a Multi-Stage Flamesheet Combustor," which claims priority to U.S. Provisional Patent Application Ser. No. 61/708,323, filed on Oct. 1, 2012, titled "Flamesheet Combustor," the entireties of which are hereby incorporated by reference herein. This application also claims the benefit of U.S. Provisional Patent Application Ser. No. 62/085,923, filed on Dec. 1, 2014, titled "Flamesheet Combustion System Start-up and Operation," the entirety of which is hereby incorporated by reference.

TECHNICAL FIELD

The present invention generally relates to a method for operating a combustion system in order to reduce emissions in a gas turbine combustor. More specifically, improvements in fuel staging for a combustor are provided.

BACKGROUND OF THE INVENTION

In an effort to reduce the amount of pollution emissions from gas-powered turbines, governmental agencies have enacted numerous regulations requiring reductions in the amount of oxides of nitrogen (NOx) and carbon monoxide (CO). Lower combustion emissions can often be attributed to a more efficient combustion process, with specific regard to fuel injector location and mixing effectiveness.

Early combustion systems utilized diffusion type nozzles, where fuel is mixed with air external to the fuel nozzle by diffusion, proximate the flame zone. Diffusion type nozzles produce high emissions due to the fact that the fuel and air burn stoichiometrically at high temperature to maintain adequate combustor stability and low combustion dynamics.

An enhancement in combustion technology is the utilization of premixing, where the fuel and air mix prior to combustion to form a homogeneous mixture that burns at a lower temperature than a diffusion type flame and produces lower NOx emissions. Premixing can occur either internal to the fuel nozzle or external thereto, as long as it is upstream of the combustion zone. An example of a premixing combustor of the prior art is shown in FIG. 1. A combustor 8 has a plurality of fuel nozzles 18, each injecting fuel into a premix cavity 19 where fuel mixes with compressed air 6 from plenum 10 before entering combustion chamber 20. Premixing fuel and air together before combustion allows for the fuel and air to form a more homogeneous mixture, which will burn more completely, resulting in lower emissions. However, in this configuration the fuel is injected in relatively the same plane of the combustor, and prevents any possibility of improvement through altering the mixing length.

An alternate means of premixing and lower emissions can be achieved through multiple combustion stages, which allows for enhanced premixing as load increases. Referring now to FIG. 2, an example of a prior art multi-stage combustor is shown. A combustor 30 has a first combustion chamber 31 and a second combustion chamber 32 separated by a venturi 33, which has a narrow throat region 34. While combustion can occur in either first or second combustion chambers or both chambers, depending on load conditions, the lowest emissions levels occur when fuel, which is injected through nozzle regions 35, is completely mixed with compressed air in first combustion chamber 31 prior to combusting in the second combustion chamber 32. Therefore, this multi-stage combustor with a venturi is more effective at higher load conditions.

Gas turbine engines are required to operate at a variety of power settings. Where a gas turbine engine is coupled to drive a generator, required output of the engine is often measured according to the amount of load on the generator, or power that must be produced by the generator. A full load condition is the point where maximum output is drawn from the generator and therefore requires a maximum power from the engine to drive the generator. This is the most common operating point for land-based gas turbines used for generating electricity. However, often times electricity demands do not require the full capacity of the generator, and the operator desires for the engine to operate at a lower load setting, such that only the load demanded is being produced, thereby saving fuel and lowering operating costs. Combustion systems of the prior art have been known to become unstable at lower load settings, especially below 50% load, while also producing unacceptable levels of NOx and CO emissions. This is primarily due to the fact that most combustion systems are staged for most efficient operation at high load settings. The combination of potentially unstable combustion and higher emissions often times prevents engine operators from running engines at lower load settings, forcing the engines to either run at higher settings, thereby burning additional fuel, or shutting down, and thereby losing valuable revenue that could be generated from the part-load demand.

A problem with shutting down the engine is the additional cycles incurred by the engine hardware. A cycle is commonly defined as the engine passing through the normal operating envelope. That is, by shutting down an engine, the engine hardware accumulates additional cycles. Engine manufacturers typically rate hardware life in terms of operating hours or equivalent operating cycles. Therefore, incurring additional cycles can reduce hardware life and require premature repair or replacement at the engine operator's expense. What is needed is a system that can provide flame stability and low emissions benefits at a part load condition, as well as at a full load condition, such that an engine can be efficiently operated at lower load conditions, thereby eliminating the wasted fuel when high load operation is not demanded or incurring the additional cycles on the engine hardware when shutting down.

SUMMARY

The present invention discloses a method of operating a gas turbine engine, and more specifically, operating the gas turbine combustor in a way to improve the turndown efficiency of the engine. In an embodiment of the present invention, a method of operating the combustor comprises supplying fuel to a pilot nozzle, igniting the fuel from the pilot nozzle, and supplying additional fuel to a stage of pilot tune injectors. The method also discloses supplying fuel to a first portion of the combustor main fuel injectors, ignition of this fuel to establish a main combustion flame, supplying fuel to a second portion of the combustor main fuel injectors and ignition of this fuel to support the main combustion flame.

In an alternate embodiment of the present invention, a computerized method for staging fuel in a gas turbine combustor is provided. The method provides a way of operating a combustor having a pilot nozzle, a set of pilot tune injectors, and a main set of fuel injectors through four different modes of operation. Each sequential mode of operation adds additional fuel flow to the combustor.

In yet another embodiment of the present invention, a method of improving the turndown capability of a gas turbine combustor while controlling carbon monoxide production is disclosed. The method modulates fuel flow to a first portion and a second portion of an annular array of fuel injectors and modulates the fuel flow to one or more injectors in a core section of the gas turbine combustor, where the core section comprises a pilot nozzle and a set of injectors for tuning the pilot nozzle. Modulation of these fuel circuits permits an overall reduction in fuel flow to support turndown capability while maintaining operation within acceptable emissions limits.

In a further embodiment of the present invention, a method of operating the combustor comprises supplying fuel to both a pilot fuel nozzle and a stage of pilot tune injectors. The fuel injected through these circuits is ignited and then additional fuel is added via a first portion of the main fuel injectors, which is ignited to generate a main combustion flame. Then, fuel is supplied to a second portion of the main fuel injectors, and this additional fuel is then ignited in order to further support the main combustion flame.

In an additional embodiment of the present invention, a method of operating the combustor comprises supplying fuel to a pilot nozzle and igniting this fuel to form a pilot flame. Additional fuel is added to the combustor by supplying fuel to a first portion of the main fuel injectors. The fuel added via the first portion of main injectors is ignited to form a main combustion flame. Then, fuel is supplied to a second portion of the main fuel injectors and ignited in order to further support the main combustion flame.

In a further embodiment of the present invention, a computerized method for staging fuel in a gas turbine combustor is provided. The method provides a way of operating a combustor having a pilot nozzle, a set of pilot tune injectors, and a main set of fuel injectors through four different modes of operation. Each sequential mode of operation adds additional fuel flow to the combustor. The combustor transitions between modes of operation at certain detected temperatures. In one aspect, the method provides a way operating a combustor through six different modes of operation.

In another embodiment of the present invention, a method of operating a gas turbine combustor is provided. The method includes supplying fuel to the pilot fuel nozzle until a first temperature is detected, upon detecting the first temperature supplying fuel to a pilot fuel nozzle and to a set of pilot tune stage injectors until a second temperature is detected, upon detecting the second temperature supplying fuel to a first portion of a main set of fuel injectors, the pilot fuel nozzle and the set of pilot tune stage injectors until a third temperature is detected, upon detecting the third temperature supplying fuel to a second portion of the main set of fuel injectors, the first portion of the main fuel set of injectors, the pilot fuel nozzle and the set of pilot tune stage injectors. In some aspects, the method begins by supplying fuel to the pilot fuel nozzle and the set of pilot tune stage injectors until the second temperature is detected. In these aspects, the first step from the method described above is bypassed and the remaining steps from the method described above remain the same. In other aspects, the method may include a sub-step after the second temperature is detected until a Main 1 flame is anchored in the combustion chamber. In yet other aspects, the method may include another sub-step after the third temperature is detected until a Main 2 flame is anchored in the combustion chamber.

In yet another embodiment of the present invention, a system for supplying fuel to a gas turbine combustor is provided. The system includes a fuel supplying component that, based upon one of at least four modes of operation, supplies fuel, to one or more of a pilot fuel nozzle, a set of pilot tune stage injectors, a first portion of a main set of fuel injectors, and a second portion of the main set of fuel injectors. The system further includes a temperature sensor that detects at least a first temperature, a second temperature and a third temperature.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 7A is an end view of a gas turbine combustor in accordance with an embodiment of the present invention operating in a first mode.

FIG. 7B is an end view of a gas turbine combustor in accordance with an embodiment of the present invention operating in a second mode.

FIG. 7C is an end view of a gas turbine combustor in accordance with an embodiment of the present invention operating in a third mode.

FIG. 7D is an end view of a gas turbine combustor in accordance with an embodiment of the present invention operating in a fourth mode.

DETAILED DESCRIPTION

By way of reference, this application incorporates the subject matter of U.S. Pat. Nos. 6,935,116, 6,986,254, 7,137,256, 7,237,384, 7,308,793, 7,513,115, and 7,677,025.

Embodiments described herein provide a way of operating a combustion system in order to improve the turndown capability of a gas turbine engine, which provides for improved combustion stability within the gas turbine combustor when the demand for power from a generator is lower and thus less output from the engine is required.

Figure 1:
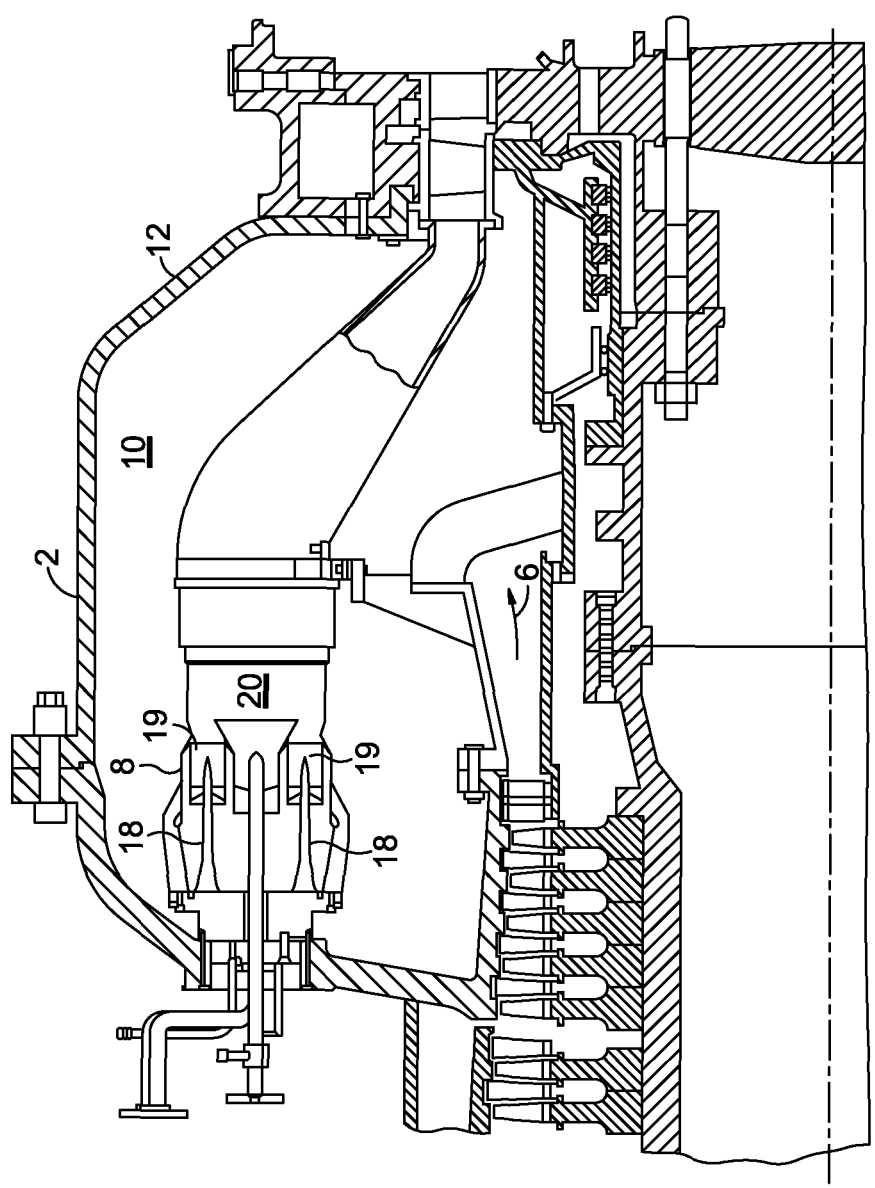
FIG. 1 is a cross section of a gas turbine combustor of the prior art.
Figure 2:
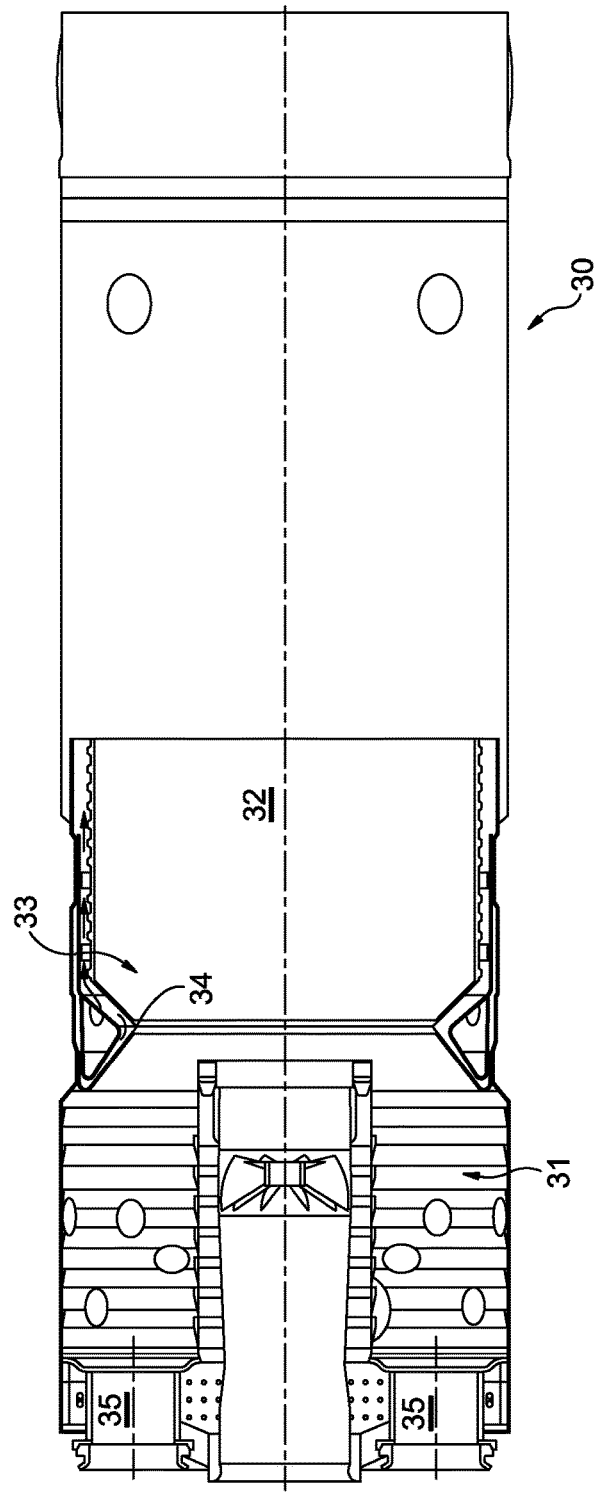
FIG. 2 is a cross section of an alternate combustor of the prior art.
Figure 3:
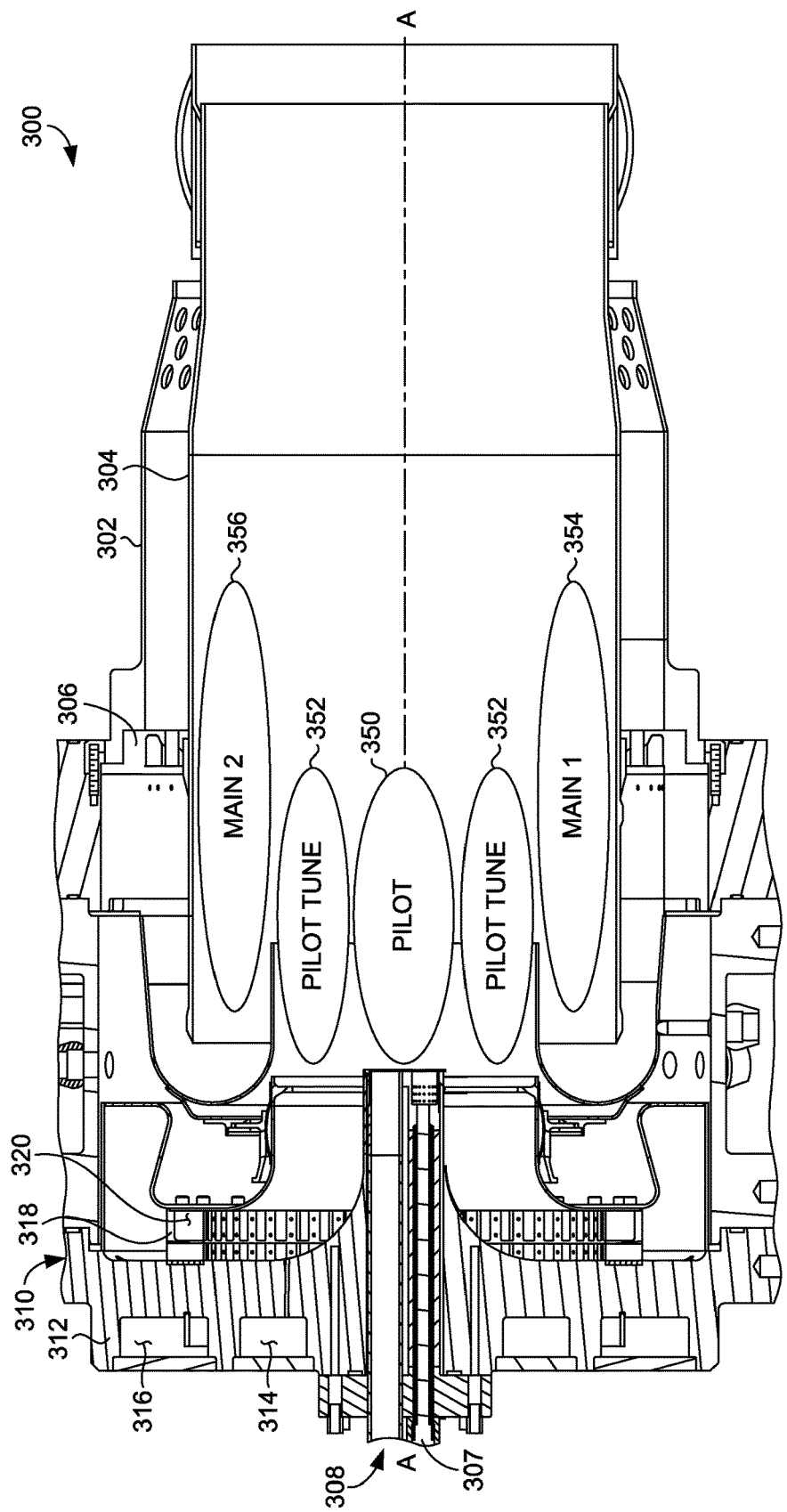
FIG. 3 is a cross section of a gas turbine combustor in accordance with an embodiment of the present invention.

Aspects will now be discussed with respect to FIGS. 3-9. An embodiment of a gas turbine combustor on which the improved operating methodology described herein can be applied is depicted in FIG. 3. The combustion system 300 extends about a longitudinal axis A-A and includes a flow sleeve 302 for directing a predetermined amount of compressor air along an outer surface of a combustion liner 304. Main fuel injectors 306 are positioned radially outward of the combustion liner 304 and are designed to provide a fuel supply to mix with compressed air along a portion of the outer surface of the combustion liner 304, prior to entering the combustion liner 304. The fuel injected by the main fuel injectors 306 mixes with compressed air and travels in a forward direction towards the inlet region of the combustion liner 304, where the fuel/air mixture then reverses direction and enters the combustion liner 304. Extending generally along the longitudinal axis A-A is a pilot fuel nozzle 308 for providing and maintaining a pilot flame for the combustion system. The pilot flame is used to ignite, support and maintain multiple stages of fuel injectors of combustion system 300.

The combustion system 300 also includes a radially staged premixer 310. The premixer 310 comprises an end cover 312 having a first fuel plenum 314 extending about the longitudinal axis A-A of the combustion system 300 and a second fuel plenum 316 positioned radially outward of the first fuel plenum 314 and concentric with the first fuel plenum 314. The radially staged premixer 310 also comprises a radial inflow swirler 318 having a plurality of vanes 320 oriented in a direction that is at least partially perpendicular to the longitudinal axis A-A of the combustion system 300.

The pilot fuel nozzle 308 is connected to a fuel supply (not shown) and provides fuel to the combustion system 300 for supplying a pilot flame 350 where the pilot flame 350 is positioned generally along the longitudinal axis A-A. The radially staged premixer 310 including the fuel plenums 314 and 316, radial inflow swirler 318 and its plurality of vanes 320 provide a fuel-air mixture through the vanes 320 for supplying additional fuel to the pilot flame 350 by way of a pilot tune stage, or P-tune, 352. The pilot tune stage 352 may include a set of pilot tune stage injectors.

As discussed above, combustion system 300 also includes main fuel injectors 306. For the embodiment of the present invention shown in FIG. 3, the main fuel injectors 306 are located radially outward of the combustion liner 304 and spread in an annular array about the combustion liner 304. The main fuel injectors 306 may comprise one or more portions and stages extending equally or unequally about a circumference of the main fuel stage. The main fuel injectors 306 may include a main set of fuel injectors having a first portion and a second portion. As an example of an application for the described invention, the main fuel injectors may be divided into two stages, the first portion and the second portion. The two portions form a circle around the primary fuel nozzle (as shown in FIG. 7A-7D) and the first portion extends approximately 120 degrees, while the second portion extends the remaining, approximately 240 degree span. The first portion of the main fuel injectors 306 generate a Main 1 flame 354 while the second portion of the main fuel injectors 306 generate a Main 2 flame 356, as shown in FIG. 4.

Figure 4:
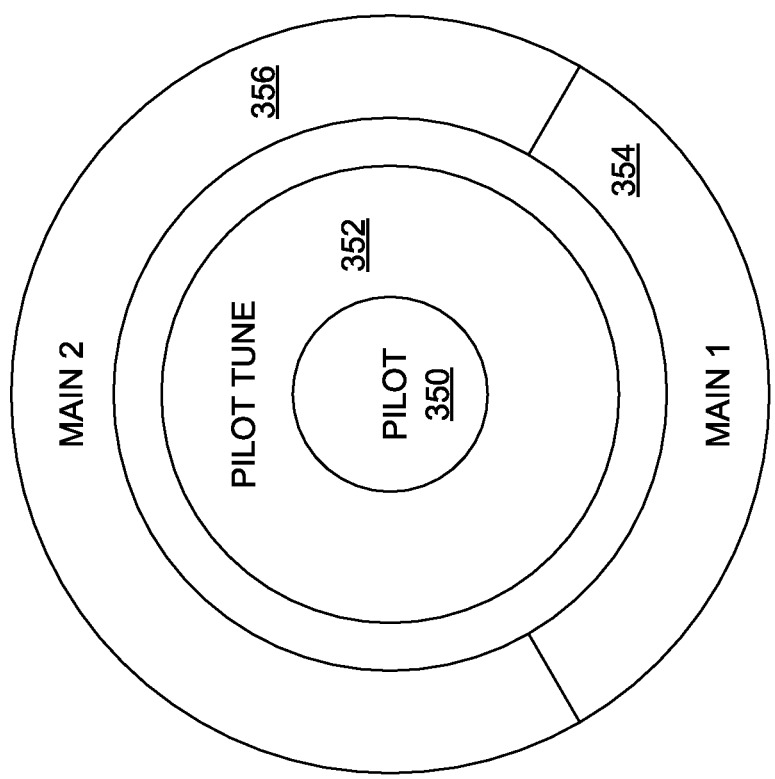
FIG. 4 is an end view of the gas turbine combustor of FIG. 1 in accordance with an embodiment of the present invention.
Figure 5:
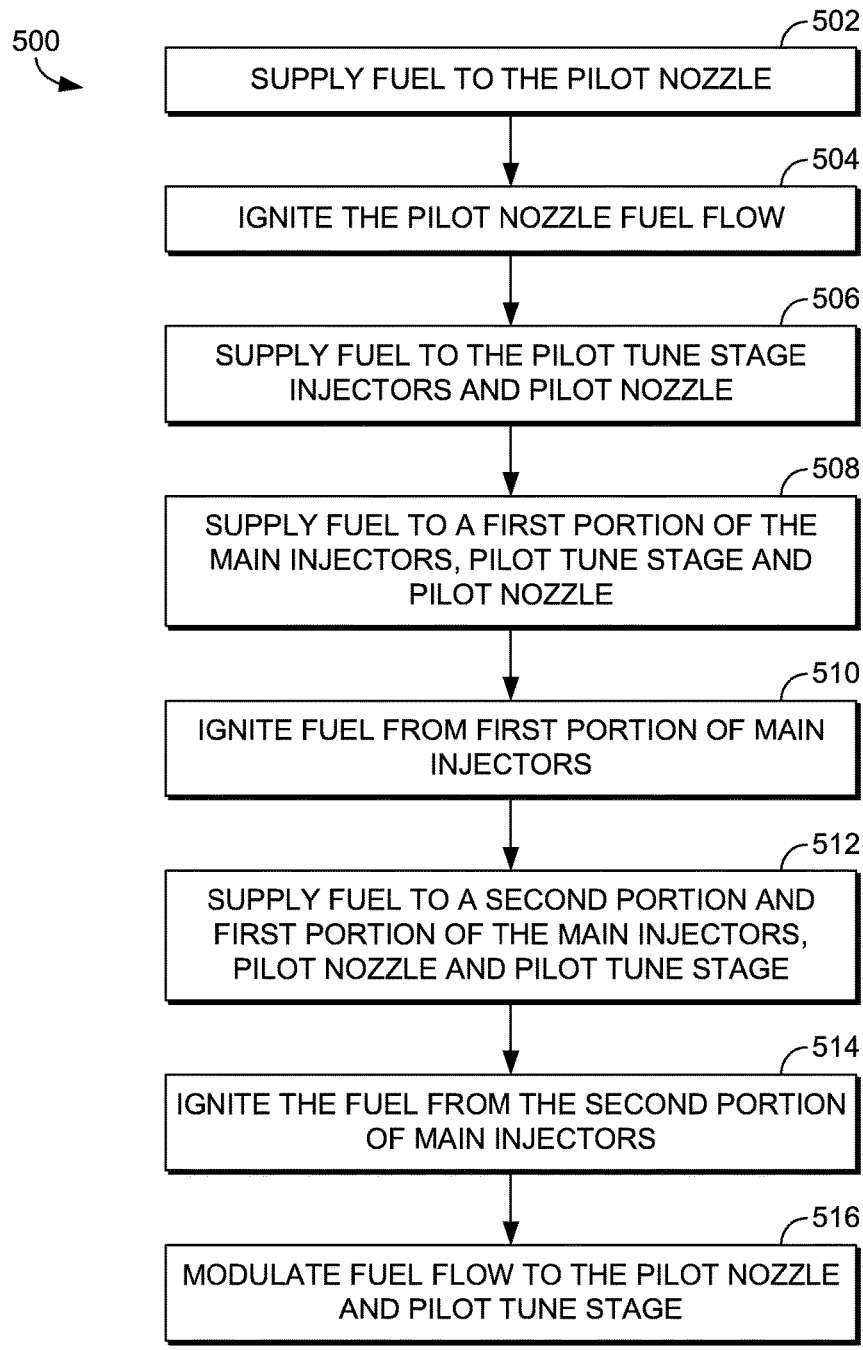
FIG. 5 is a flow diagram depicting a process of controlling a gas turbine combustor in accordance with an embodiment of the present invention.

Referring to FIG. 4, an aft view, looking forward into the gas turbine combustor of FIG. 3 is depicted. FIG. 4 displays the radial and circumferential location of each of the flame locations within combustion system 300, with pilot flame 350 at the center, pilot tune stage 352 located radially outward of the pilot flame 350 and Main 1 flame 354 and Main 2 flame 356 located radially outward of the pilot tune stage 352.

As described above, a gas turbine engine incorporates a plurality of combustors. Generally, for the purpose of discussion, the gas turbine engine may include low emission combustors such as those disclosed herein and may be arranged in a can-annular configuration about the gas turbine engine. One type of gas turbine engine (e.g., heavy duty gas turbine engines) may be typically provided with, but not limited to, 6 to 18 individual combustors, each of the combustors fitted with the components outlined above. Accordingly, based on the type of gas turbine engine, there may be several different fuel circuits utilized for operating the gas turbine engine. For an embodiment of the present invention, there are four fuel circuits employed. However, it is envisioned that the specific fuel circuitry and associated control mechanisms could be modified to include fewer or additional fuel circuits.

Having discussed the physical arrangement of the combustion system 300 in which the present invention operates, reference will now be made to FIGS. 5-9 for a detailed description of the methods of operation for this combustion system. The present invention utilizes four fuel stages for tuning and operational flexibility. More specifically, with respect to FIG. 5, a method 500 of operating the combustion system 300 of FIG. 3 is outlined, in which four different fuel stages are utilized to enhance combustion stability so as to allow for operation at lower load settings. Initially in a step 502, fuel is supplied to a pilot fuel nozzle of the gas turbine combustor. Then, in a step 504, the fuel from the pilot fuel nozzle is ignited to form a pilot flame. This ignition can occur through a variety of ignition sources such as a spark igniter or a torch 307 (shown in FIG. 3). The torch 307 may also be utilized to supplement the pilot flame 350 or pilot tune flame 352 during mode transfer to further stabilize such flame about the central flame axis. The pilot flame 350 or pilot tune flame 352 may be supplemented by supplying fuel through the torch circuit. In some aspects, the fuel supplied through the torch circuit may be transferred from at least one of the pilot and pilot tune circuits. In other aspects, the fuel supplied through the torch circuit may be additional fuel supplied in addition to the fuel supplied through the pilot and pilot tune circuits. As the pilot fuel nozzle is generally located along the longitudinal axis of the combustor, the resulting pilot flame is also located generally along the longitudinal axis. These steps of supplying fuel to the pilot fuel nozzle and igniting the fuel to form the pilot flame is considered Mode 1 of operation of the combustion system and operates starting with the ignition or "light-off" of the pilot fuel. A depiction of Mode 1 operation of the combustion system is shown in both FIGS. 6A and 7A.

A flame inherently contains a shear layer. Generally speaking, a shear layer, or boundary layer is a region of flow in which there can be significant velocity gradient. The shear layer of a flame is the shared region between the outermost edge of the flame and the non-flammable surroundings or an adjacent flame.

Ignition of fuel from a main set of fuel injectors can occur more easily and reliably due to the ability to control the fuel/air ratio of the shear layer of the pilot flame. More specifically, by locally increasing the supply of fuel at an outermost radial location in the premix passage, the concentration of fuel in the shear layer of the resulting pilot flame is increased. As a result, the richened shear layer allows the main injectors to more easily and reliably ignite without the need for a lot of energy, which then results in lower pulsation levels during ignition of the main fuel injectors.

An additional benefit of being able to locally richen the fuel flow to the shear layer is the ability to maintain a stable process of igniting the fuel being injected by the main injectors. That is, in a premixed combustion system, fuel flow levels are traditionally kept as lean as possible in order to reduce emissions. By locally adding fuel to the shear layer during a selective time period, a more fuel-rich mixture is established, thereby increasing the fuel/air ratio in the shear layer region. A more fuel-rich mixture provides more favorable conditions for ignition to occur and increases the stability of the flame. Once the flame is ignited, then the level of fuel richness can be reduced to a leaner mixture without jeopardizing the stability of the flame.

In a step 506, fuel continues to be supplied to the pilot fuel nozzle, as in the step 502 while also being supplied to a set of pilot tune stage injectors. The pilot tune stage injectors are located in the plurality of vanes 320 of radial inflow swirler 318, which are located radially outward of the pilot fuel nozzle 308, and inject fuel from the fuel plenums of the end cover to mix with a surrounding airflow. This fuel-air mixture then passes along the pilot flame and is used to enhance and support the pilot flame as well as to richen the shear layer of the pilot flame. The operation of the pilot fuel nozzle and set of pilot tune stage injectors together is considered Mode 2 of operation for the combustion system. Mode 2 can operate from light-off up until approximately 10% load. A depiction of the Mode 2 operation of the combustion system is shown in both FIGS. 6B and 7B where fuel/air mixture from the pilot tune stage is shown radially outward of and encompassing the pilot flame.

Figure 6C:
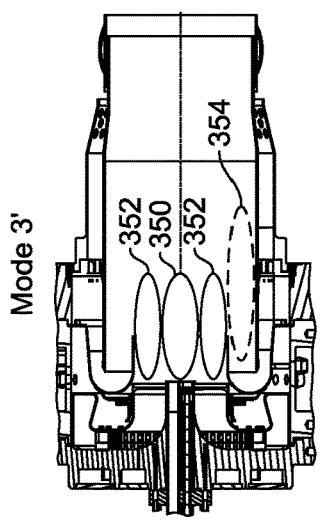
FIG. 6C is a cross section view of a gas turbine combustor in accordance with an embodiment of the present invention operating in a third prime mode (i.e., Mode 3').
Figure 6D:
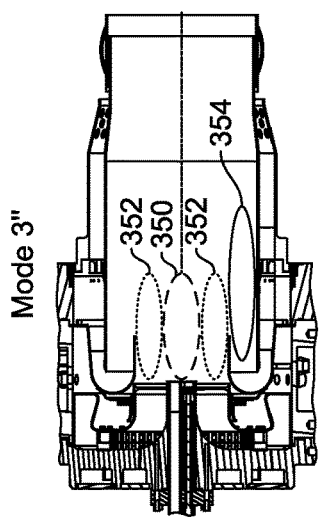
FIG. 6D is a cross section view of a gas turbine combustor in accordance with an embodiment of the present invention operating in a third double prime mode (i.e., Mode 3").
Figure 6B:
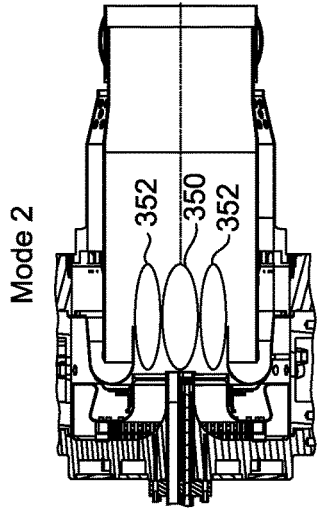
FIG. 6B is a cross section view of a gas turbine combustor in accordance with an embodiment of the present invention operating in a second mode.

In a step 508, the combustion system enters a Mode 3 of operation where fuel is supplied to a first portion of the main fuel injectors, while also still being supplied to the pilot fuel nozzle and the set of pilot tune stage injectors. As discussed above, the main fuel injectors 306 of the combustion system are arranged in an annular array about the combustion liner and are divided into two portions—a first portion extending approximately 120 degrees around the combustion liner 304 and a second portion extending approximately 240 degrees about the combustion liner 304. In a step 510, the fuel injected in the step 508 by the first portion of the main fuel injectors is ignited to form a main combustion flame. Ignition of the main combustion flame occurs as a result of the established pilot flame through Modes 1 and 2. However, to ignite this main combustion flame, the combustion system typically ramps up to this point by adding fuel to the pilot tune stage (at the end of Mode 2), where upon transfer to Mode 3, the fuel added via the pilot tune stage is then transferred to the first portion of main fuel injectors. This ensures an efficient and quiet transfer into Mode 3. Fuel can be supplied to the first portion of the main set of fuel injectors beginning at light-off and through approximately the 10% load condition. A depiction of the Mode 3 operation of the combustion system is shown in FIGS. 6C, 6D and 7C where the main combustion flame established in Mode 3 is located radially outward of the fuel-air mixture from the pilot tune stage of injectors.

Mode 3 may comprise two sub-modes, a Mode 3' and a Mode 3". Mode 3' is a portion of Mode 3 comprising the step 508. Mode 3" is a portion of Mode 3 comprising the step 510. In one aspect, upon anchoring the Main 1 flame 354 in Mode 3', the supply of fuel to the pilot fuel nozzle and the set of pilot tune stage injectors is turned down (for example, by adjusting the fuel split between the fuel circuits and directing fuel towards the first portion of the main set of fuel injectors) during Mode 3" to avoid a spike in pressure, temperature or fuel. Mode 3' is illustrated in FIG. 6C, where the Main 1 flame 354 has not yet been anchored and is depicted as such by the dashed lines. Mode 3" is illustrated in FIG. 6D, where the supply of fuel to the primary flame 350 and the pilot tune flame 352 are turned down.

In a step 512, the combustion system operates in a Mode 4, where fuel is supplied to a second portion of the main fuel injectors as well as to the first portion of the main fuel injectors, the pilot fuel nozzle and the pilot tune stage of injectors. Thus, in Mode 4 of operation, fuel is flowing through all four circuits of the combustion system and is now flowing to all of the main fuel injectors. As a result, a 360 degree ring of fuel is injected into the passing air flow from the main fuel injectors and radially outward of the combustion liner. In a step 514, the fuel injected by the second portion of the main fuel injectors is ignited due to the main combustion flame established by the fuel injected from the first portion of main fuel injectors. This is the Mode 4 operation. Fuel can be injected through the second portion of the main fuel injectors beginning at light-off through approximately the 25% load condition. Fuel continues to flow through these circuits to approximately a 100% load condition, or what is also referred to as a baseload condition. Operation in Mode 4 provides a wide and stable operating range for the combustion system. A depiction of the Mode 4 operation of the combustion system is shown in both FIGS. 6E, 6F and 7D where the main combustion flame is enhanced by the fuel injection in Mode 4 and extends circumferentially about the pilot flame.

Figure 6E:
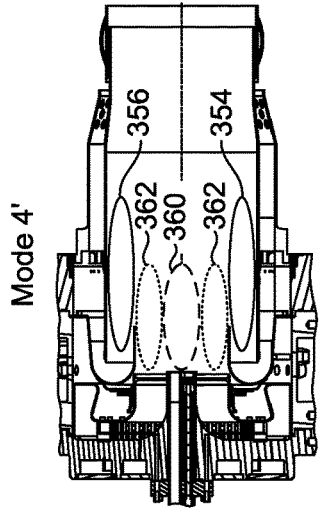
FIG. 6E is a cross section view of a gas turbine combustor in accordance with an embodiment of the present invention operating in a fourth prime mode (i.e., Mode 4').
Figure 6A:
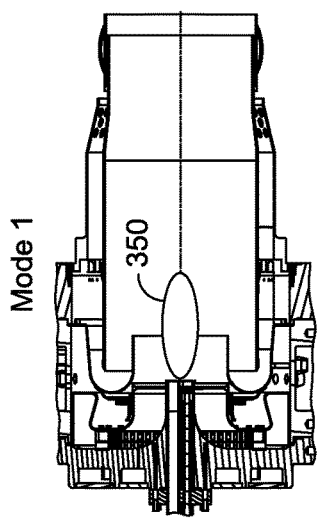
FIG. 6A is a cross section view of a gas turbine combustor in accordance with an embodiment of the present invention operating in a first mode.
Figure 6F:
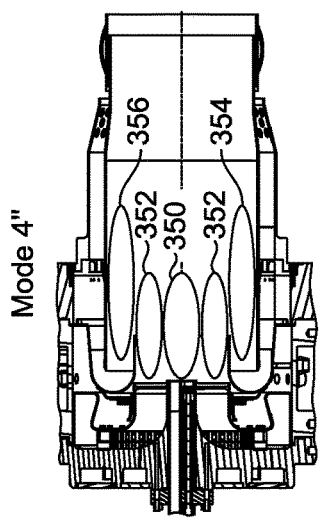
FIG. 6F is a cross section view of a gas turbine combustor in accordance with an embodiment of the present invention operating in a fourth double prime mode (i.e., Mode 4").

Mode 4 may comprise two sub-modes, a Mode 4' and a Mode 4". Mode 4' is a portion of Mode 4 comprising supplying fuel through the second portion of the main set of fuel injectors and anchoring the Main 2 flame 356 in the combustion chamber, while the supply of fuel to the pilot fuel nozzle and the set of pilot tune stage injectors is turned down. Mode 4" is a portion of Mode 4 comprising removing the turndown condition (i.e., ramping up fuel supply) and increasing the fuel supplies to all four fuel circuits until baseload is reached. Mode 4' is illustrated in FIG. 6E, where the Main 2 flame 356 has been anchored while the pilot flame 350 and pilot tune flame 352 are depicted by the dashed lines to represent the turned down condition. Mode 4" is illustrated in FIG. 6F, where the supply of fuel is provided through all four fuel circuits each of the four flames (i.e., the pilot flame 350, the pilot tune stage flame 352, the Main 1 flame 354 and the Main 2 flame 356). In some aspects, Mode 4' may be skipped and operation of the gas turbine combustor may move directly to Mode 4" (i.e., fuel is supplied to the second portion of the main set of fuel injectors, the Main 2 flame 356 is ignited, and the turndown of the fuel supply to the pilot fuel nozzle and the set of pilot tune stage injectors is removed all in the same step in Mode 4).

Once the combustion system has reached a baseload or 100% load condition, with fuel flowing through all four circuits, it is possible to modulate the fuel flow to one or more of the circuits supplying fuel to the core of the combustor, that is a modulated pilot fuel nozzle flow and/or a modulated flow to the pilot tune stage. For example, the fuel flow may be modulated by turndown and moving the gas turbine engine back to Mode 4' as shown in FIG. 6E. Reducing the amount of fuel is desirable when a lower load is demanded. However, traditionally, where fuel flow levels are reduced, flame temperature tends to decrease, which results in a corresponding rise in CO emissions. For example, referring back to FIG. 5, in a step 516, the fuel flow to the core injection region, that is the pilot fuel nozzle and/or the pilot tune stage injectors, can be adjusted. However, by maintaining the fuel flow to both the first portion and second portion of the main fuel injectors while modulating the fuel flow to the pilot fuel nozzle and/or the pilot tune stage of injectors, as depicted in FIG. 6E, the main combustion flame remains in a complete ring and at a hotter temperature than the pilot flame. Thus, the hotter main combustion flame will consume the CO generated by the colder pilot flame. This modulation of Mode 4 occurs during a normal premix operation of the combustion system.

When the power being demanded from the engine is reduced or turned down, it is desirable to effectively reduce the engine output while still maintaining operation of the engine. When less power is demanded of the engine, less fuel is necessary in the combustion process. Therefore, to turn down the engine, fuel flow must also be reduced. However, as discussed above, when fuel flow levels are reduced, flame temperature tends to decrease, which results in a rise in CO emissions. Therefore, it is necessary to adequately burn off this additional CO in order to keep the engine within emissions regulations. One way to burn off the CO emissions is to keep the main combustion flame generated by the first portion and second portion of the main fuel injectors as hot as possible. This can be accomplished through careful modulation of the fuel flow to the fuel injectors. More specifically, the fuel flow to the core region (pilot fuel nozzle and/or pilot tune stage injectors) may be reduced, while the fuel flow to the first portion and second portion of the main stage injectors may be increased slightly. The net overall effect is a lower total fuel flow rate to the combustor, but a higher ratio of fuel being directed to support the main flame than the pilot and/or pilot tune stage, as fuel flow to the pilot region either decreases or is extinguished.

Although the steps of supplying the fuel flow and ignition of the injected fuel are discussed sequentially, one skilled in the art will understand that in order to maintain the flame that results from ignition of the fuel that has just been injected, the fuel flow must continue or the resulting flame will extinguish. Thus, for the steps of fuel supply/injection to occur both prior to and simultaneous with the ignition of the fuel.

In an alternate embodiment of the present invention, the combustion system 300 comprises the four main fuel circuits for providing fuel to a pilot fuel nozzle, a set of pilot tune injectors and two circuits to the Main 1 and Main 2 flames forming a main combustion flame, as discussed above. However, it has been determined that combustion noise and emissions improvements can be achieved utilizing the present hardware without initially directing fuel to only the pilot fuel nozzle, but instead fueling both the pilot fuel nozzle and the set of pilot tune stage injectors to achieve initial light-off.

Figure 8:
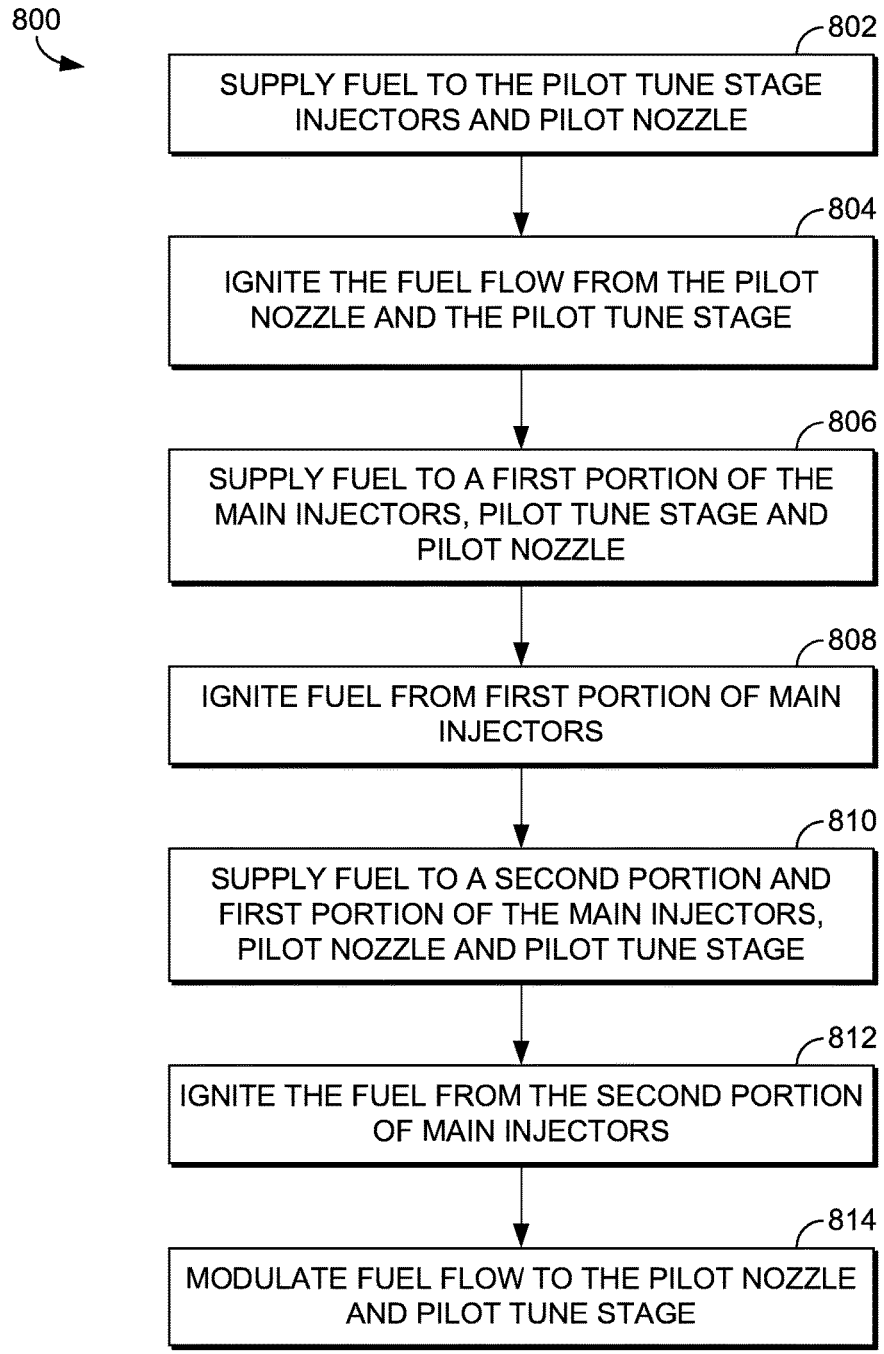
FIG. 8 is a flow diagram depicting a process of controlling a gas turbine combustor in accordance with an alternate embodiment of the present invention.

Referring to FIG. 8, the alternate process for operating the gas turbine combustor is disclosed in process 800. In a step 802, fuel is initially supplied to a pilot fuel nozzle and a set of pilot tune stage injectors of the gas turbine combustor. Then, in a step 804, the fuel injected by the pilot fuel nozzle and pilot tune stage injectors is ignited. Once a flame is established in the pilot region, fueling of the pilot fuel nozzle and the stage of pilot tune injectors continues through approximately a 10% load condition. Then in a step 806, fuel is supplied to a first portion of a set of main fuel injectors. As discussed above, the first portion of the set of main fuel injectors consists of an approximately 120 degree arc-shaped section of fuel injectors. Fuel continues to flow to the pilot fuel nozzle and the pilot tune stage while fuel is being supplied to the first portion of the set of main fuel injectors. In a step 808, the fuel injected by the first portion of the set of main fuel injectors ignites to form a main combustion flame. The fuel injected by the first portion of the main fuel injectors can begin as early as lightoff through approximately 10% load condition. Once the main combustion flame is established, then in a step 810, fuel is then supplied to a second portion of the set of main fuel injectors, while continuing to supply fuel to the first portion of the set of main injectors, the pilot fuel nozzle, and the pilot tune stage injectors. Fuel can be supplied to the second portion of the main fuel injectors beginning at light-off and approximately a 25% load condition. Then, in a step 812, the fuel injected by the second portion of the set of main fuel injectors is ignited in order to enhance the main combustion flame. As with the other embodiment discussed above, in a step 814, the fuel flow to the pilot tune stage injectors and pilot fuel nozzle can then be modulated in order to enhance the flame stability.

Figure 9:
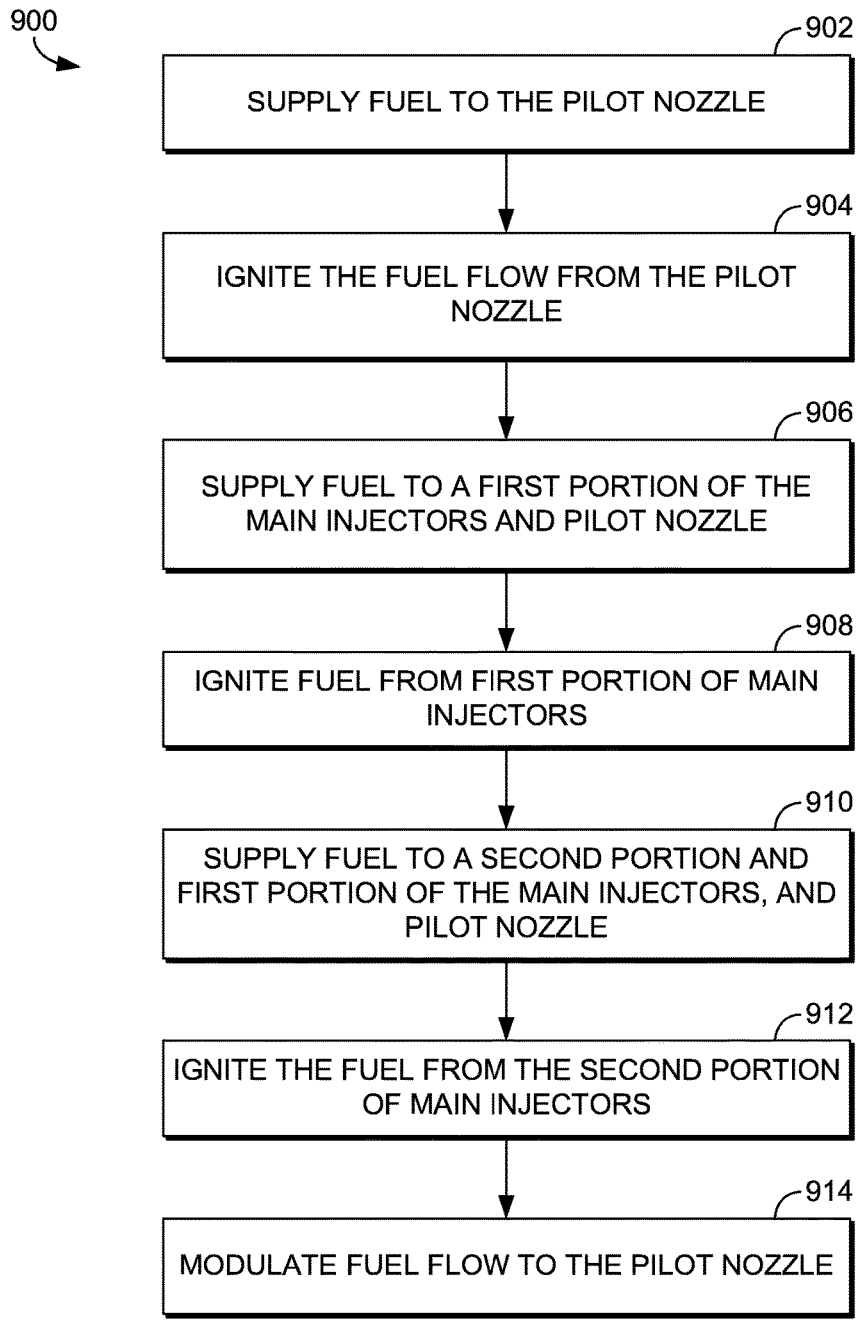
FIG. 9 is a flow diagram depicting a process of controlling a gas turbine combustor in accordance with yet another embodiment of the present invention.

In yet another embodiment of the present invention, a method of operating a gas turbine combustor has been developed where fuel is supplied to three circuits and not a pilot tune stage of injectors, as previously discussed. Referring now to FIG. 9, the method 900 of operating the gas turbine combustor comprises a step 902 of supplying fuel to a pilot fuel nozzle of the gas turbine combustor. Then, in a step 904, the fuel injected by the pilot fuel nozzle is ignited to form a pilot flame. In a step 906, fuel is supplied to a first portion of a set of main fuel injectors while continuing to fuel the pilot fuel nozzle. Fuel can be supplied to the first portion of the main fuel injectors beginning at light-off and approximately a 10% load condition. Then, in a step 908, the fuel from the first portion of main injectors is ignited to form a main combustion flame.

In a step 910, fuel is supplied to a second portion of the set of main fuel injectors while also being supplied to the first portion of the main fuel injectors and the pilot fuel nozzle. Fuel can be supplied to the second portion of the main injectors beginning between light-off and approximately a 25% load condition. In one such embodiment of the present invention, the first portion of main injectors extend about approximately 120 degrees, in an arc-shaped path, while the second portion of the main injectors extend approximately 240 degrees of an arc-shaped path. In a step 912, the fuel supplied to the combustor by the second portion of main injectors is ignited and serves to enhance the main combustion flame. As discussed above, fuel continues to flow through these various circuits up to approximately 100% load. Depending on the operating conditions of the engine, the process can continue in a step 914 where fuel flow to the pilot nozzle can be modulated. As discussed above, this modulation can include reducing the amount of fuel flow to the pilot fuel nozzle in order to support engine turndown while controlling CO emissions.

Aspects described herein may be embodied as, among other things a method, system, or computer-program product. Accordingly, the embodiments may take the form of a hardware embodiment, a software embodiment, or an embodiment combining software and hardware. In one embodiment, the present invention takes the form of a computerized method, such as a computer-program product that includes computer-useable instructions embodied on one or more computer-readable media.

Computer-readable media include both volatile and non-volatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

It is within the scope of this invention that the computerized method may be a stand-alone software program stored on its own piece of hardware that can be integrated within the operating system of the gas turbine engine or can be a software program that is designed to be integrated into existing software governing the operating system of the gas turbine engine.

Figure 10:
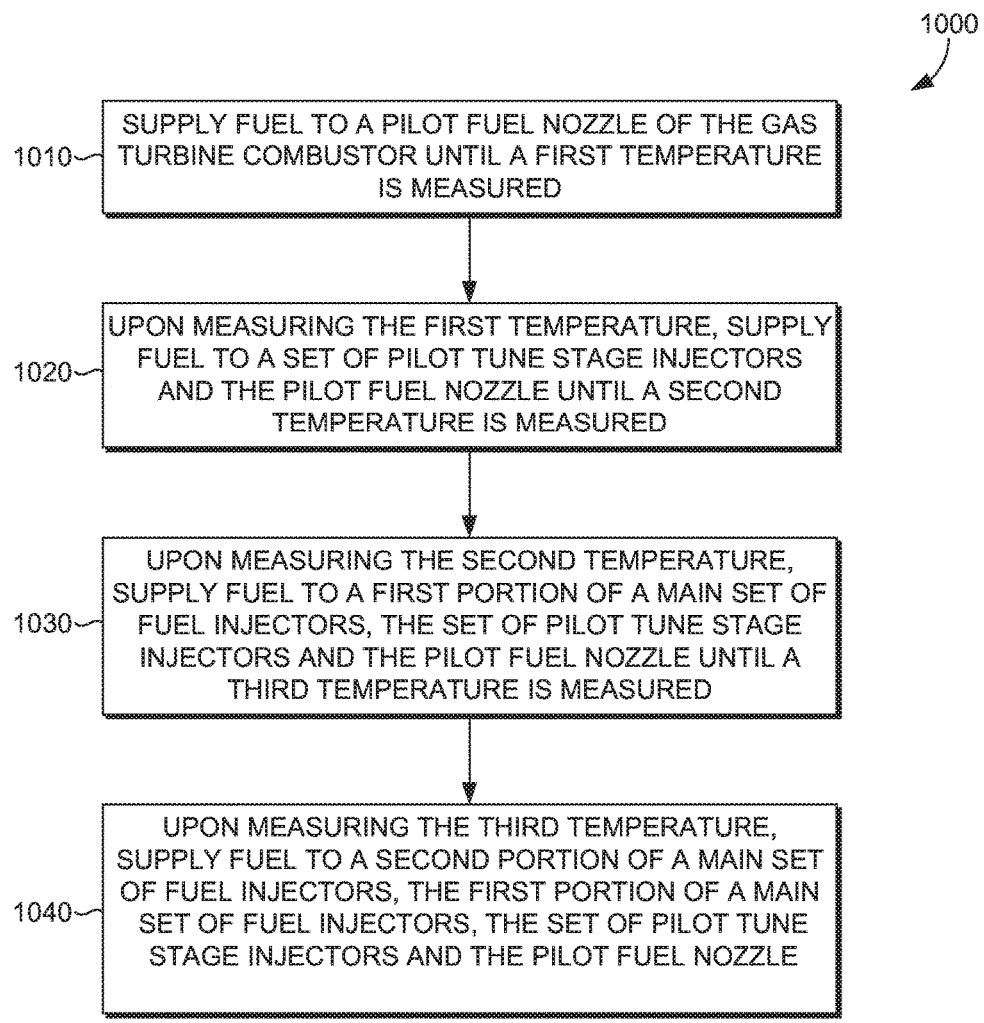
FIG. 10 is a flow diagram depicting a process of controlling a gas turbine combustor in accordance with an embodiment of the present invention.

A way of operating a gas turbine engine based upon temperature detection will now be disclosed. Referring to FIG. 10, a method 1000 of operating a gas turbine combustor is provided. The method 1000 may include supplying fuel to a pilot fuel nozzle until a first temperature is detected, as depicted in block 1010. The method 1000 may further include that upon detecting the first temperature supplying fuel to a set of pilot tune stage injectors and to the pilot fuel nozzle until a second temperature is detected, as depicted in block 1020. The method 1000 may further include that upon detecting the second temperature supplying fuel to a first portion of a main set of fuel injectors, to the set of pilot tune stage injectors, and to the pilot fuel nozzle until a third temperature is detected, as depicted in block 1030. The method 1000 may further include that upon detecting the third temperature supplying fuel to a second portion of the main set of fuel injectors, to the first portion of the main set of fuel injectors, to the set of pilot tune stage injectors, and to the pilot fuel nozzle, as depicted in block 1040.

Block 1010 represents Mode 1 operation of the gas turbine engine. Block 1020 represents Mode 2 operation of the gas turbine engine. Block 1030 represents Mode 3 operation of the gas turbine engine. Block 1040 represents Mode 4 operation of the gas turbine engine.

As discussed above, some embodiments may include the two sub-modes of Mode 3 (i.e., Mode 3' and Mode 3"). Mode 3' is the operating mode in which the fuel is flowing to the first portion of the set of main fuel injectors but where the fuel emitted by the first portion of the set of main fuel injectors has not yet formed an anchored flame. In other words, Mode 3' provides fuel through the Main 1 flame circuit (for example, the first portion of the set of main fuel injectors) in a lower flow state prior to achieving Main 1 flame 354 anchoring without the necessity of prefill (i.e., ramping up the pressure). Beginning Mode 3 in the Mode 3' condition allows the fuel supplied to the first portion of the main fuel injectors (i.e., the Main 1 circuit) to be steadily increased until the Main 1 flame is anchored. Ramping up the gas turbine combustor to Mode 3' provides a dynamics margin, allows the gas turbine engine to load, and lessens the spike in fuel/load that is required to get the Main 1 flame 354 to light and anchor successfully.

It is desirable during the ramp up of the gas turbine combustor from light off to baseload to maintain a steady increase in temperature. Hence, when the gas turbine combustor transitions from Mode 3' to Mode 3", some embodiments may turndown the supply of fuel to one or more of the pilot fuel nozzle and the set of pilot tune stage injectors.

In one embodiment, the method 1000 may further include that upon detecting the second temperature, operating the gas turbine combustor in Mode 3' until anchoring of the Main 1 flame. The method 1000 may further include turning down the supply of the fuel to one or more of the pilot fuel nozzle and the pilot tune stage injectors. The method 1000 may further include upon anchoring the Main 1 flame operating the gas turbine combustor in Mode 3" until the third temperature is detected.

As discussed above, other embodiments may include the two sub-modes of Mode 4 (i.e., Mode 4' and Mode 4"). Mode 4' is the operating mode where the fuel is supplied to the second portion of the set of main fuel injectors and the Main 2 flame 356 is ignited and anchored while the supply of fuel to the one or more of the pilot fuel nozzle and the pilot tune stage injectors is turned down. In other words, Mode 4' provides fuel to the Main 2 flame circuit (for example, the second portion of the set of main fuel injectors) to establish and anchor the Main 2 flame while the supply of the fuel to one or more of the pilot fuel nozzle and the pilot tune stage injectors is turned down. Once the Main 2 flame is anchored, the gas turbine combustor may transition from Mode 4' to Mode 4" where the fuel split between the set of main fuel injectors and pilot fuel nozzle and pilot tune stage injectors is adjusted and the gas turbine combustor is ramped up to baseload.

In one embodiment, the method 1000 may further include that upon detecting the third temperature operating the gas turbine combustor in Mode 4' until anchoring of the Main 2 flame is achieved. The method 1000 may further include upon anchoring the Main 2 flame operating the gas turbine combustor in Mode 4" until baseload is reached.

In another embodiment, the method 1000 may combine the operation of Mode 4' and Mode 4". In other words, that upon detecting the third temperature operating the gas turbine combustor in Mode 4 until ignition of the Main 2 flame and adjusting the fuel split between the set of main fuel injectors and pilot fuel nozzle and pilot tune stage injectors until the gas turbine combustor is ramped up to baseload.

As discussed above, the method 1000 uses temperature as a way to control the transition between modes of operating the gas turbine combustor. For example, the gas turbine combustor transitions from Mode 1 to Mode 2 after a first temperature is detected. Similarly, the gas turbine combustor transitions from Mode 2 to Mode 3 after a second temperature is detected. Likewise, the gas turbine combustor transitions from Mode 3 to Mode 4 after a third temperature is detected.

The temperature used to control the modes of operating the gas turbine combustor may be any temperature detected, directly or indirectly, by a temperature sensor or calculated with reference to a detected temperature. For example, the temperature may be a turbine inlet temperature, an exhaust temperature of a gas turbine engine, or a firing temperature. These are exemplary temperatures that may be used to control the gas turbine combustor and any other temperature detected and/or calculated upstream or downstream of the turbine inlet may be used. The temperature sensor may be any suitable temperature detection tool known in the art (for example, a thermocouple, a thermometer, a thermistor, an infrared device, etc.).

The temperatures at which the combustor transitions between modes may be predefined set points. For example, the first temperature, the second temperature and the third temperature may all be predefined. In some aspects, the combustor may operate over a range of temperatures from 700° F. to 2,500° F., representing the temperature of ignition of the pilot flame 350 through the temperature of baseload. When ramping up the gas turbine engine, the combustor may transition between the above described modes of operation at the predefined set points. For example, in some aspects the combustor may transition from Mode 1 to Mode 2 at a set point temperature between 1,000° F. and 1,500° F. In other aspects, the combustor may transition from Mode 1 to Mode 2 at a set point temperature between 1,000° F. and 1,300° F. In some exemplary aspects, the combustor may transition from Mode 2 to Mode 3' at a set point temperature between 1,500° F. and 1,800° F. In other exemplary aspects, the combustor may transition from Mode 3' to Mode 3" at a set point temperature between 1650° F. and 1950° F. In yet other exemplary aspects, the combustor may transition from Mode 3" to Mode 4' at a set point temperature between 1800° F. and 2100° F. In one exemplary aspect, the combustor may transition from Mode 4' to Mode 4" at a set point temperature between 1,800° F. and 2,100° F. In another exemplary aspect, the combustor may transition directly from Mode 3" to Mode 4" at a set point temperature between 1,800° F. and 2,100° F., as further described herein this application.

In some embodiments, the method 1000 may omit supplying fuel to the pilot fuel nozzle until the first temperature is detected, as depicted in block 1010. In other words, the method 1000 may begin operating in Mode 2 and skip Mode 1.

In another embodiment of the present invention, a computerized method 1100 for staging fuel in a gas turbine combustor is provided. The method 1100 provides a way of operating a combustor having a pilot nozzle, a set of pilot tune injectors, and a main set of fuel injectors through the four operating modes discussed above.

In another embodiment of the present invention, a system for supplying fuel to a gas turbine combustor is provided. The system comprises a fuel supplying component, a temperature sensor, and a control unit.

The fuel supplying component is configured to supply fuel to a pilot fuel nozzle when the gas turbine combustor is operating in Mode 1, supply fuel to the pilot fuel nozzle and a set of pilot tune stage injectors when the gas turbine combustor is operating in Mode 2, supply fuel to the pilot fuel nozzle, the set of pilot tune stage injectors, and a first portion of a main set of fuel injectors when the gas turbine combustor is operating in Mode 3, and supply fuel to the pilot fuel nozzle, the set of pilot tune stage injectors, the first portion of the main set of fuel injectors, and a second portion of the main set of fuel injectors when the gas turbine combustor is operating in Mode 4. For example, in one aspect the fuel supplying component may comprise the above described four fuel circuits and control mechanisms to switch one or more of the four fuel circuits on or off and control mechanisms to transfer fuel between two or more of the four fuel circuits.

The temperature sensor, or array of sensors, is configured to detect at least a first temperature, a second temperature, and a third temperature. The control unit is configured to transition the gas turbine combustor, from the first operating mode to the second operating mode upon detection of the first temperature, from the second operating mode to the third operating mode upon detection of the second temperature, and from the third operating mode to the fourth operating mode upon detection of the third operating temperature.

In alternative embodiments, the gas turbine combustor may be controlled by detection of parameters other than temperatures, such as operational percent load, turbine speed, or a combination thereof. In some aspects the combustor transitions between modes of operation based upon detection of predefined turbine speed set points. In this application, turbine speed refers to the gas turbine engine rotor speed. In other aspects, the combustor may transition between a first portion of the modes of operation (as described above) based upon detection of the predefined turbine speed set points and may transition between a second portion of the modes of operation (as described above) based upon detection of the predefined temperature set points.

Figure 11:
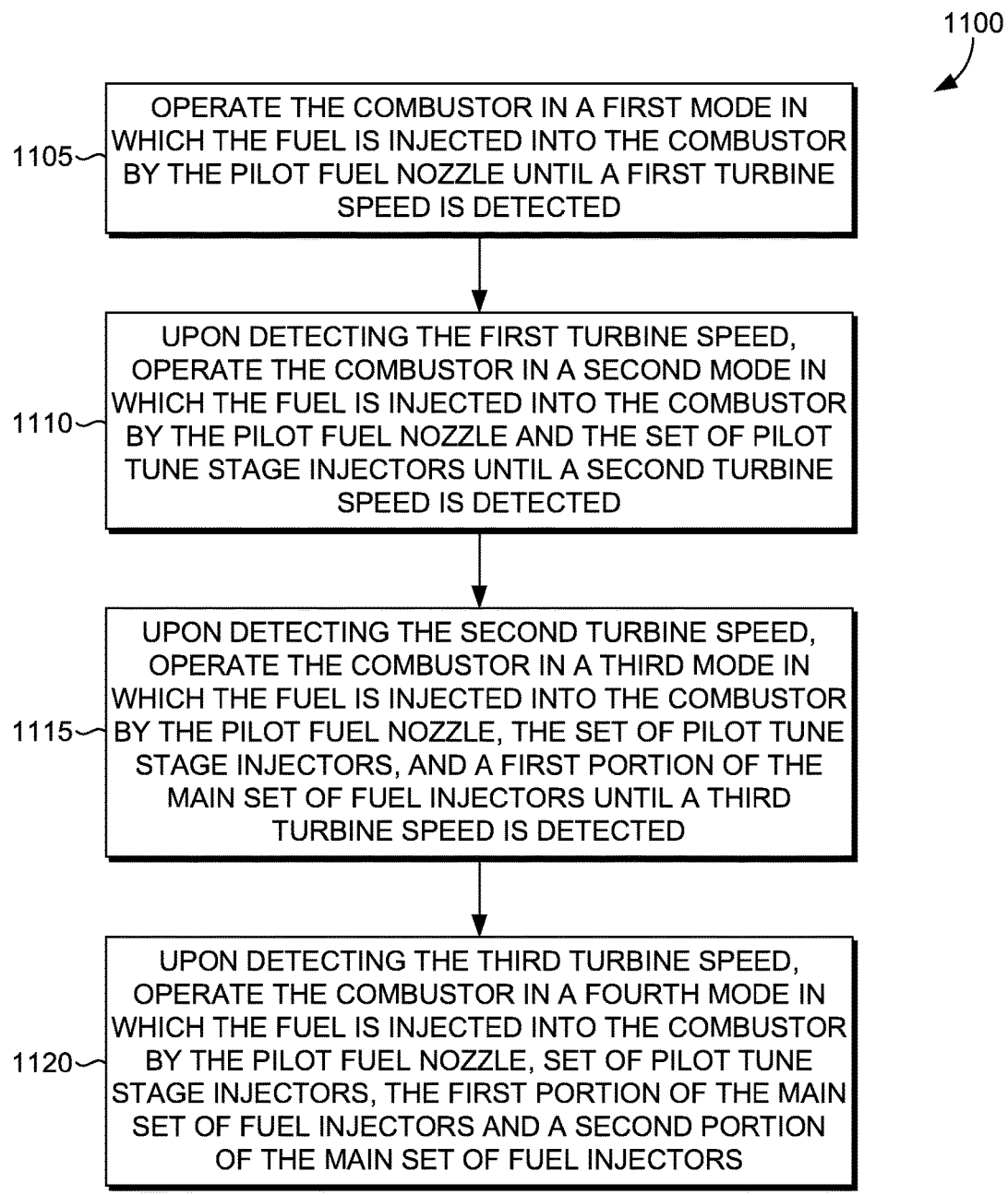
FIG. 11 is a flow diagram depicting a process of controlling a gas turbine combustor in accordance with an embodiment of the present invention.

Referring to FIG. 11, in one embodiment a method 1100 of controlling a gas turbine combustor comprises operating the combustor in a first mode in which the fuel is injected into the combustor by the pilot fuel nozzle until a first turbine speed is detected, as depicted in block 1105. The method 1100 may further comprise upon detecting the first turbine speed, operating the combustor in a second mode in which the fuel is injected into the combustor by the pilot fuel nozzle and the set of pilot tune stage injectors until a second turbine speed is detected, as depicted in block 1110. The method 1100 may further comprise upon detecting the second turbine speed, operating the combustor in a third mode in which the fuel is injected into the combustor by the pilot fuel nozzle, the set of pilot tune stage injectors, and a first portion of the main set of fuel injectors until a third turbine speed is detected, as depicted in block 1115. The method 1100 may further comprise upon detecting the third turbine speed, operating the combustor in a fourth mode in which the fuel is injected into the combustor by the pilot fuel nozzle, set of pilot tune stage injectors, the first portion of the main set of fuel injectors and a second portion of the main set of fuel injectors, as depicted in block 1120.

Figure 12:
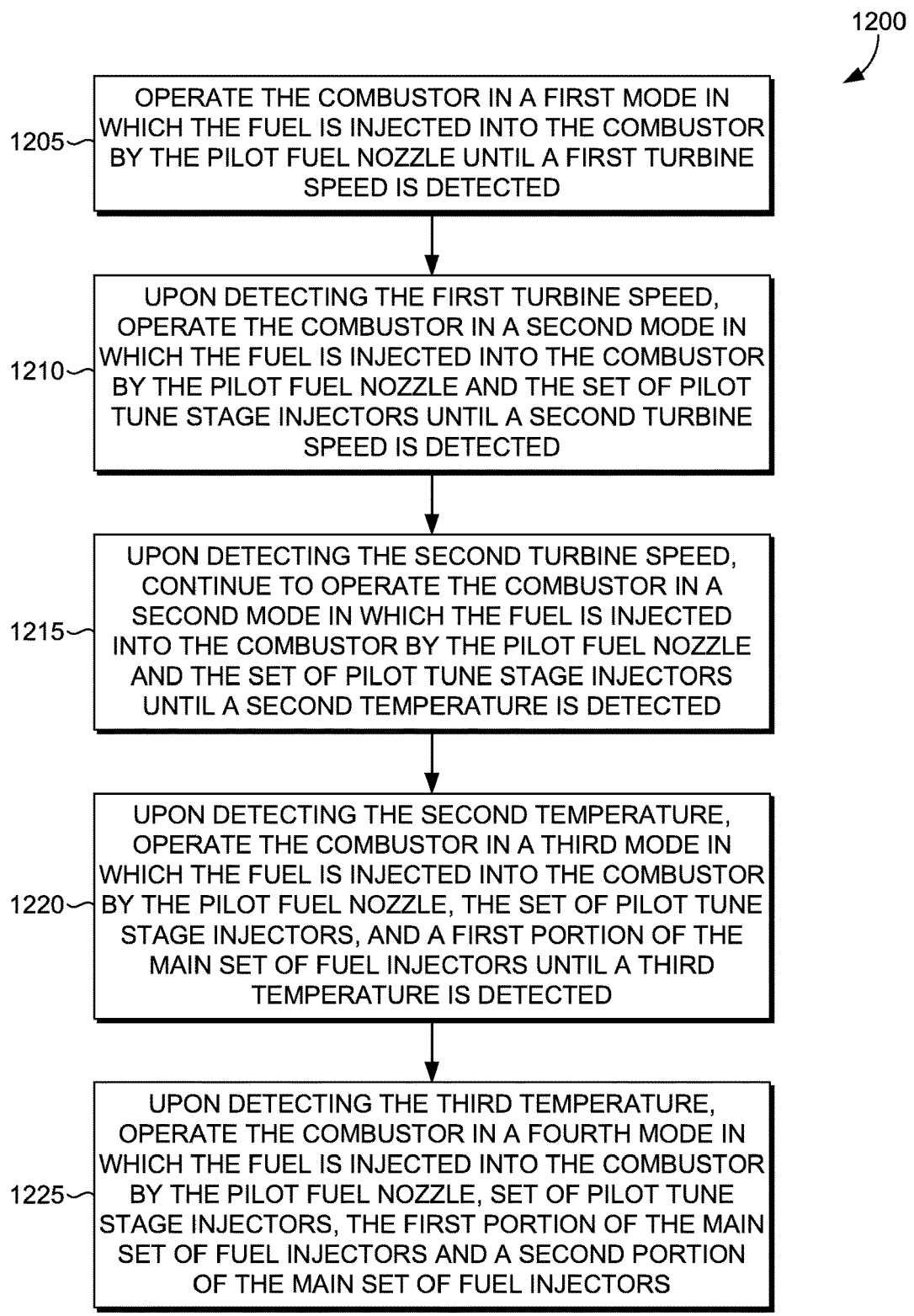
FIG. 12 is a flow diagram depicting a process of controlling a gas turbine combustor in accordance with an embodiment of the present invention.

Referring to FIG. 12 in another embodiment a method 1200 of controlling a gas turbine combustor comprises operating the combustor in a first mode in which the fuel is injected into the combustor by the pilot fuel nozzle until a first turbine speed is detected, as depicted in block 1205. The method 1200 may further comprise upon detecting the first turbine speed, operating the combustor in a second mode in which the fuel is injected into the combustor by the pilot fuel nozzle and the set of pilot tune stage injectors until a second turbine speed is detected, as depicted in block 1210. The method 1200 may further comprise upon detecting the second turbine speed, continuing to operate the combustor in a second mode in which the fuel is injected into the combustor by the pilot fuel nozzle and the set of pilot tune stage injectors until a second temperature is detected, as depicted in block 1215. The method 1200 may further comprise upon detecting the second temperature, operating the combustor in a third mode in which the fuel is injected into the combustor by the pilot fuel nozzle, the set of pilot tune stage injectors, and a first portion of the main set of fuel injectors until a third temperature is detected, as depicted in block 1220. The method 1200 may further comprise upon detecting the third temperature, operating the combustor in a fourth mode in which the fuel is injected into the combustor by the pilot fuel nozzle, set of pilot tune stage injectors, the first portion of the main set of fuel injectors and a second portion of the main set of fuel injectors, as depicted in block 1225.

In some embodiments, upon anchoring the pilot flame 350 during startup, the turbine speed may be 500 revolutions per minute. Startup may occur in either Mode 1 or Mode 2. In embodiments where startup occurs in Mode 1, transfer to Mode 2 may occur at a predefined turbine speed set point between 1,000 and 2,500 revolutions per minute. In further embodiments, turbine speed predefined set points may be implemented for Mode 1 to Mode 2 to Mode 3' to Mode 3" to Mode 4' to Mode 4" beginning at 800 rpm through 3,550 rpm. In other embodiments, turbine speed predefined set points may be implemented beginning at 1,200 rpm through 3,400 rpm. In some embodiments the incremental range between each turbine speed predefined set point may be 50 to 300 rpm.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive. Alternative embodiments and required operations will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for staging fuel in a gas turbine combustor where the gas turbine combustor has a pilot fuel nozzle, a set of pilot tune stage injectors for tuning the pilot fuel nozzle and a main set of fuel injectors, the method comprising the steps of:
   operating the combustor in a first mode in which the fuel is injected into the combustor by the pilot fuel nozzle until a first temperature is detected;
   upon detecting the first temperature, operating the combustor in a second mode in which the fuel is injected into the combustor by the pilot fuel nozzle and the set of pilot tune stage injectors until a second temperature is detected;
   upon detecting the second temperature, operating the combustor in a third mode in which the fuel is injected into the combustor by the pilot fuel nozzle, the set of pilot tune stage injectors, and a first portion of the main set of fuel injectors until a third temperature is detected; and
   upon detecting the third temperature, operating the combustor in a fourth mode in which the fuel is injected into the combustor by the pilot fuel nozzle, set of pilot tune stage injectors, the first portion of the main set of fuel injectors and a second portion of the main set of fuel injectors.

2. The computerized method of claim 1, wherein the third mode comprises two sub-modes, Mode 3' and Mode 3".

3. The computerized method of claim 1, wherein the first mode is bypassed and the method begins by operating the combustor in a second mode in which the fuel is injected into the combustor by the pilot fuel nozzle and the set of pilot tune stage injectors until a second temperature is detected.

4. The computerized method of claim 1, wherein the first portion of the main set of fuel injectors extend across an arc-like span of approximately 120 degrees and the second portion of the main set of fuel injectors extend across an arc-like span of approximately 240 degrees.

5. The computerized method of claim 1, wherein the first mode provides a pilot flame to the gas turbine combustor.

6. The computerized method of claim 5, wherein the fuel injected by the set of pilot tune stage injectors provides an additional fuel source for modulating and supporting the pilot flame.

7. The computerized method of claim 6, wherein the gas turbine combustor further includes a torch configured to provide additional fuel to supplement the fuel injected by the pilot fuel nozzle and the set of pilot tune stage injectors for modulating and supporting the pilot flame.

8. The computerized method of claim 1, wherein the fuel injected by the third mode and fourth mode is injected in an axially upstream direction and undergoes a reversal of direction prior to ignition.

9. The computerized method of claim 1, wherein the fuel flow to the pilot fuel nozzle and the injectors of the pilot tune stage is adjustable after operating the combustor in the fourth mode.

10. A method of operating a gas turbine combustor comprising:

supplying fuel to a pilot fuel nozzle of the gas turbine engine and to a set of pilot tune stage injectors until a second temperature is detected, wherein the set of pilot tune stage injectors are positioned radially outward of the pilot fuel nozzle;

upon detecting the second temperature, supplying the fuel to a first portion of a set of main fuel injectors, the pilot fuel nozzle, and the set of pilot tune stage injectors until a third temperature is detected; and upon detecting the third temperature, supplying the fuel to a second portion of the set of main fuel injectors, the first portion of the set of main injectors, the pilot fuel nozzle and the set of pilot tune stage injectors.

11. The method of claim 10 further comprising:
supplying the fuel to the pilot fuel nozzle of the gas turbine combustor until a first temperature is detected, wherein the supplying fuel to a pilot fuel nozzle of the gas turbine engine and to a set of pilot tune stage injectors until a second temperature is detected is not commenced until the first temperature is detected.

12. The method of claim 11, wherein the gas turbine combustor transitions from a first operating mode to a second operating mode at the first temperature.

13. The method of claim 12, wherein the gas turbine combustor transitions from a second operating mode to a third operating mode at the second temperature.

14. The method of claim 13, wherein the gas turbine combustor transitions from a third operating mode to a fourth operating mode at the third temperature.

15. The method of claim 14, wherein the upon detecting the second temperature, supplying the fuel to a first portion of a set of main fuel injectors, the pilot fuel nozzle, and the set of pilot tune stage injectors until a third temperature further comprises:

upon anchoring a Main 1 flame, turning down the supply of fuel to at least one of the pilot fuel nozzle and the set of pilot tune stage injectors.

16. The method of claim 10, wherein at least one of the first temperature, the second temperature, or the third temperature is a firing temperature of the gas turbine combustor at the pilot fuel nozzle.

17. The method of claim 10, further comprising:
coupling a first turbine stage to the gas turbine combustor, wherein at least one of the first temperature, the second temperature, or the third temperature is a turbine inlet temperature of the combustion gases at the first turbine stage.

18. The method of claim 10, wherein at least one of the first temperature, the second temperature, or the third temperature is an exhaust temperature of a gas turbine engine to which the gas turbine combustor is coupled.

19. The method of claim 10, wherein the set of main fuel injectors are positioned radially outward of the pilot fuel nozzle and the set of pilot tune stage injectors.

20. The method of claim 10, wherein the gas turbine combustor further comprises a torch configured to provide additional fuel to supplement the fuel injected by the pilot fuel nozzle and the set of pilot tune stage injectors for modulating and supporting the pilot flame.

* * * * *